(12) United States Patent
Despotopoulou et al.

(10) Patent No.: US 10,294,414 B2
(45) Date of Patent: May 21, 2019

(54) COMPOSITIONS AND METHODS FOR BREAKING HYDRAULIC FRACTURING FLUIDS

(71) Applicant: Arkema Inc., King of Prussia, PA (US)

(72) Inventors: Marina Despotopoulou, Havertown, PA (US); Leonard H. Palys, Downingtown, PA (US); Michael B. Abrams, Bala Cynwyd, PA (US); Joseph M. Brennan, Swarthmore, PA (US); Scot A. Swan, Norristown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/512,174

(22) PCT Filed: Sep. 3, 2015

(86) PCT No.: PCT/US2015/048213
§ 371 (c)(1),
(2) Date: Mar. 17, 2017

(87) PCT Pub. No.: WO2016/043977
PCT Pub. Date: Mar. 24, 2016

(65) Prior Publication Data
US 2017/0275528 A1    Sep. 28, 2017

Related U.S. Application Data

(60) Provisional application No. 62/052,555, filed on Sep. 19, 2014.

(51) Int. Cl.
*C09K 8/90* (2006.01)
*C09K 8/88* (2006.01)
(Continued)

(52) U.S. Cl.
CPC ............... *C09K 8/90* (2013.01); *C09K 8/035* (2013.01); *C09K 8/68* (2013.01); *C09K 8/685* (2013.01); *C09K 8/887* (2013.01); *C09K 2208/26* (2013.01)

(58) Field of Classification Search
None
See application file for complete search history.

(56) References Cited

U.S. PATENT DOCUMENTS 3,922,173 A    11/1975  Misak
4,259,205 A *  3/1981  Murphey ............... C04B 26/14
                                              166/294

(Continued)

FOREIGN PATENT DOCUMENTS

CA     2 579 970 A1      8/2008
WO  WO 2013/148167 A2   10/2013

(Continued)

OTHER PUBLICATIONS

ChemYQ Tert-Butyl Hydroperoxide; TBHP; 1,1-Dimethylethyl Hydroperoxide; 2-Hydroperoxy-2-Methylpropane; Cadox TBH.

(Continued)

*Primary Examiner* — John J Figueroa
(74) *Attorney, Agent, or Firm* — Lynn B. Morreale

(57) ABSTRACT

A breaker composition for use in a fracturing fluid comprises water, at least one peroxide (e.g., tert-butyl hydroperoxide), and optionally at least one alcohol (e.g., propylene glycol and/or a butyl alcohol). The peroxide(s) and optional alcohol(s) are present in amounts effective to reduce the viscosity of a fracturing fluid at a temperature of 90-300 F. (the "breaking temperature"), and to prevent rehealing of the fracturing fluid, i.e., to maintain the reduced viscosity for a period of time after the temperature is reduced from the breaking temperature to a temperature below the breaking tempera- (Continued)

ture (e.g., after the temperature is reduced from the breaking temperature to room temperature).

24 Claims, 4 Drawing Sheets

(51) Int. Cl.
*C09K 8/68* (2006.01)
*C09K 8/035* (2006.01)

(56) References Cited

U.S. PATENT DOCUMENTS

| | | | |
|---|---|---|---|
| 5,447,199 A | 9/1995 | Dawson et al. | |
| 6,133,204 A | 10/2000 | Newhouse et al. | |
| 8,383,557 B2 | 2/2013 | Huang et al. | |
| 2005/0261138 A1* | 11/2005 | Robb | C09K 8/68 507/209 |
| 2008/0020758 A1 | 1/2008 | Nagarajan et al. | |
| 2008/0039347 A1* | 2/2008 | Welton | C09K 8/08 507/213 |
| 2008/0202758 A1* | 8/2008 | Delorey | C09K 8/685 166/308.2 |
| 2009/0082228 A1 | 3/2009 | Paris et al. | |
| 2011/0247821 A1 | 10/2011 | Thompson et al. | |
| 2012/0318515 A1* | 12/2012 | Cawiezel | C09K 8/035 166/310 |
| 2013/0213657 A1 | 8/2013 | Dobson, Jr. et al. | |
| 2013/0324445 A1 | 12/2013 | Quintero et al. | |
| 2016/0009985 A1* | 1/2016 | Brennan | C09K 8/685 507/211 |

FOREIGN PATENT DOCUMENTS

| | | |
|---|---|---|
| WO | WO 2013/148167 A3 | 10/2013 |
| WO | WO 2014/133853 A1 | 9/2014 |

OTHER PUBLICATIONS

Hydroperoxide, 1-1-Dimethylethyl: 1,1-Dimeethylethyl-Hyproperoxide; Hydroperoxide, Tert-Butyl; Hydroperoxyde De Butyle Tertiaire. CAS: 75-91-2 ; pp. 1-2; Web Archive—Apr. 2009 (As cited in the PCT Search Report).

* cited by examiner

COMPOSITIONS AND METHODS FOR BREAKING HYDRAULIC FRACTURING FLUIDS

CROSS-REFERENCE TO RELATED APPLICATIONS

This application is a national stage application under 35 U.S.C. § 371 of PCT/US2015/048213 filed Sep. 3, 2015, which claims benefit to U.S. patent application Ser. No. 62/052,555, filed Sep. 19, 2014.

FIELD OF THE INVENTION

The present invention relates to breaking compositions that prevent rehealing of aqueous treatment fluids and methods for using the breaking compositions to fracture subterranean formations in oil and gas recovery.

BACKGROUND OF THE INVENTION

Hydraulic fracturing is a technique commonly used to stimulate the production of oil and gas from subterranean geologic formations of low permeability. The process is carried out by drilling a wellbore that penetrates the formation and provides a sufficiently unimpeded flowpath for the hydrocarbons to reach the surface. In such treatments, aqueous treatment fluids (also known as fracturing fluids) are introduced into the subterranean formation under sufficient pressure and having sufficient viscosity to create fractures in the formation and to propagate these fractures out into the formation. The aqueous treatment fluids may contain entrained proppants, such as sand or sintered bauxite, so that as the aqueous treatment fluid seeps into the formation, the fractures close upon the proppants to maintain the fractures in an open state for increased permeability.

In using certain aqueous treatment fluids, the high viscosity of the fluids should be maintained while the fractures are being created and propagated, in order to aid in transporting the proppants to the farthest reaches of the fractures. After the proppants have been trapped in the fractures, however, it is desirable that the viscosity of the aqueous treatment fluid is quickly reduced to allow the fluid to flow back through the fractures, around the proppants, and back into the wellbore. Compositions utilized to reduce the viscosity of fracturing fluids are commonly called "breakers" or "breaker fluids."

A breaker may be added to the fractures externally, i.e., separately from the fracturing fluid. Alternatively, an internal breaker may be incorporated into the initial fracturing fluid. Such breakers preferably have a delayed break profile, so that the fracturing fluid does not break prematurely (before the fracturing fluid has been introduced a sufficient distance into the fracture) or too late (causing slow recovery of the fracturing fluid and/or dislodging of proppant).

Breakers have previously included oxidizers, acids, and enzymes that degrade the polymeric gel structure of fracturing fluids.

U.S. Pat. No. 3,922,173 is directed to processes for producing a controlled reduction in viscosity of aqueous gels when t-butyl hydroperoxide is used as a breaker.

U.S. Pat. No. 5,447,199 is directed to breakers comprising organic peroxides that have a water solubility of about 1 g/100 g or less.

U.S. Pat. No. 8,383,557 is directed to breaker compositions in the form of oil-water emulsions.

U.S. Publication No. 2008/0202758 is directed to breaker compositions that include an organic peroxide and a diluent comprising an organic solvent.

U.S. Publication No. 2011/0247821 is directed to breaker compositions comprising oxidative components and ester components.

U.S. Publication No. 2013/0324445 is directed to breaker compositions that are microemulsions or nanoemulsions.

A common problem with breakers is the eventual "rehealing" of the fracturing fluid. Even though the fracturing fluid has a decreased viscosity at bottom hole temperatures after being broken, the fluid "reheals" or gains viscosity when cooled. This causes great difficulty in drawing fluids back through the fractures to the surface. There remains a need for breaker compositions and methods that inhibit, retard, and/or substantially prevent rehealing of fracturing fluids in subterranean treatment operations when the temperature is reduced.

SUMMARY OF THE INVENTION

Embodiments of the present invention relate to breaker compositions and methods of using the compositions in conjunction with aqueous treatment fluids (also referred to as "fracturing fluids," "fracture fluids," or "high viscosity aqueous gels"). The applicants have discovered that breaker compositions containing at least one peroxide can prevent the rehealing of an aqueous treatment fluid when the temperature of the aqueous treatment fluid is reduced. For example, it was found that aqueous treatment fluids that have been combined with breaker compositions containing tert-butyl hydroperoxide and water only partially "reheal" after the temperature of the aqueous treatment fluid has been reduced from 180-250° F. to room temperature. Moreover, it was surprisingly found that aqueous treatment fluids that have been combined with breaker compositions containing tert-butyl hydroperoxide and at least one alcohol (e.g., propylene glycol and/or tert-butyl alcohol) can maintain a reduction in viscosity, such that no rehealing, or substantially no rehealing is observed, after the temperature of the aqueous treatment fluid has been reduced from 180-250° F. to room temperature.

Aqueous treatment fluids that have been combined with tert-butyl hydroperoxide and at least one alcohol selected from the group consisting of propylene glycol, tert-butyl alcohol, and glycerol, or at least one saccharide selected from the group consisting of mon-saccharides and di-saccharides, such as fructose and sucrose, are preferred.

Embodiments of the present invention relate to a breaker composition for use in an aqueous treatment fluid, the breaker composition comprising, consisting essentially of, or consisting of:
  water;
  at least one peroxide (e.g., tert-butyl hydroperoxide); and
  optionally at least one alcohol (e.g., propylene glycol and/or tert-butyl alcohol),
  wherein the at least one peroxide and the at least one optional alcohol are present in amounts effective to reduce the viscosity of an aqueous treatment fluid at a temperature of 90-300° F. (the "breaking temperature"), and to maintain a reduced viscosity for a period of time after the temperature is reduced from 90-300° F. to a temperature below the breaking temperature, preferably to room temperature.

Embodiments of the present invention also relate to an aqueous treatment fluid comprising, consisting essentially of, or consisting of:
  water;

at least one gelling agent;
at least one crosslinking agent; and
a breaker composition that comprises, consists essentially of, or consists of:
  water;
  at least one peroxide (e.g., tert-butyl hydroperoxide); and
  optionally at least one alcohol (e.g., propylene glycol and/or tert-butyl alcohol),
  wherein the at least one peroxide and the at least one optional alcohol are present in amounts effective to reduce the viscosity of an aqueous treatment fluid at a temperature of 90-300° F. (the "breaking temperature"), and to maintain a reduced viscosity for a period of time after the temperature is reduced from 90-300° F. to a temperature below the breaking temperature, preferably to room temperature.

Embodiments of the present invention also relate to a method for maintaining a reduction in viscosity of an aqueous treatment fluid, said method comprising, consisting essentially of, or consisting of:
  combining a breaker composition with an aqueous treatment fluid,
  wherein the aqueous treatment fluid comprises water, at least one gelling agent, and at least one crosslinking agent,
  wherein the breaker composition comprises, consists essentially of, or consists of:
    water;
    at least one peroxide (e.g., tert-butyl hydroperoxide); and
    optionally at least one alcohol (e.g., propylene glycol and/or tert-butyl alcohol),
  wherein the breaker composition reduces the viscosity of the aqueous treatment fluid at a breaking temperature of 90-300° F. (e.g., 100-280° F. or 170-230° C. or 180-250° F. or 200-240° C.), and
  wherein the breaker composition maintains a reduced viscosity of the aqueous treatment fluid for a period of time (e.g., at least one hour) after the temperature is reduced from 90-300° F., preferably to room temperature.

Embodiments of the present invention also relate to a method for fracturing a subterranean formation comprising, consisting essentially of, or consisting of the steps of:
  injecting into the subterranean formation under fracturing conditions an aqueous treatment fluid and a breaking composition,
  wherein the aqueous treatment fluid comprises a gelling agent and a crosslinking agent,
  wherein the breaking composition comprises, consists essentially of, or consists of:
    water;
    at least one peroxide (e.g., tert-butyl hydroperoxide); and
    optionally at least one alcohol (e.g., propylene glycol and/or tert-butyl alcohol),
  wherein the breaker composition causes the aqueous treatment fluid to have a reduced viscosity at a temperature of 90-300° F. (e.g., 100-280° F. or 170-230° C. or 180-250° F. or 200-240° C.), and
  wherein the breaker composition causes the aqueous treatment fluid to maintain a reduced viscosity for a period of time after the temperature is reduced from 90-300° F., preferably to room temperature.

Aqueous treatment fluids that have been combined with tert-butyl hydroperoxide and at least one alcohol selected from the group consisting of propylene glycol and tert-butyl alcohol, or at least one saccharide selected from the group consisting of mono-saccharides and di-saccharides, including fructose and sucrose, are preferred as are methods for preventing rehealing using such aqueous treatment fluids.

DESCRIPTION OF THE DRAWINGS

FIG. 1 and Example 1 demonstrate that substantially no rehealing of a fracture fluid was observed when the breaker composition contained t-butylhydroperoxide and propylene glycol.

FIG. 2 and Example 2 demonstrate that partial rehealing inhibition of a fracture fluid was observed when the breaker composition contained t-butylhydroperoxide and no added alcohol.

FIG. 3 and Example 3 demonstrate that substantially complete rehealing of a fracture fluid was observed when the breaker composition contained ammonium persulfate.

FIG. 4 corresponds to Example 4 and demonstrates a full break at 230° F. and no rehealing when the composition contained-butyl hydroperoxide and glycerol.

FIG. 5 corresponds to Example 5 and demonstrates a full break at 230° F. and no rehealing when the composition contained-butyl hydroperoxide and fructose.

FIG. 6 corresponds to Example 6 and demonstrates a full break at 230° F. and no rehealing when the composition contained-butyl hydroperoxide and sucrose.

FIG. 7 corresponds to Example 7 and demonstrates a full break at 230° F. and no rehealing when the composition contained-butyl hydroperoxide and t-butyl alcohol.

DETAILED DESCRIPTION

Figure 1:
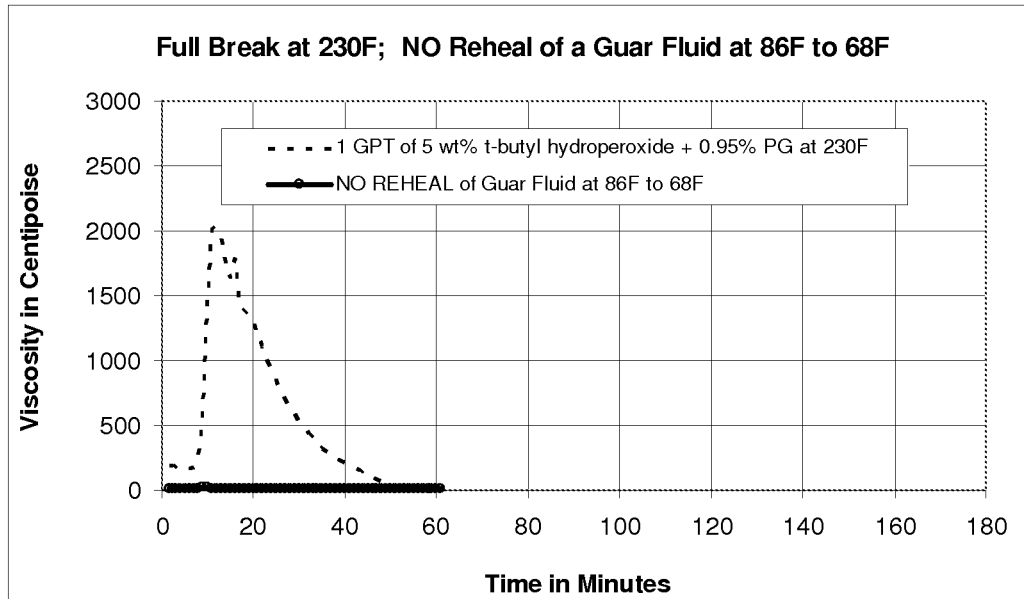
FIGS. 1-3 pertain to Examples 1-3, respectively.

"Aqueous treatment fluid" or "fracturing fluid" or "fracture fluid" are used herein interchangeably to mean a fluid suitable for use in fracturing, gravel packing, and/or acidizing fluids, and the like. In particular, the aqueous treatment fluid is suitable for use in hydraulic fracturing operations for oil and gas recovery, including fracking.

"Breaker," "breaking composition," or "breaking fluid" are used herein to mean a composition that reduces the viscosity of the aqueous treatment fluid. Most broadly, breakers may work in any suitable manner, for example, by degrading the gelling agents (also referred to as viscosifying polymers) in an aqueous treatment fluid by attacking the cross-links, cleaving the polymer chain, or the like, or by other mechanisms, including mechanisms specific to a particular breaker, breaking composition, or breaking fluid.

As used herein, "viscosity" has its ordinary meaning: a measure of the internal resistance of a fluid (or a measure of fluid friction). A fluid with a higher viscosity is "thicker" than a fluid with a lower viscosity. Appropriate viscosities of the aqueous treatment fluid during fracturing and recovery of the aqueous treatment fluid are readily ascertainable by one skilled in the art.

As used herein, "breaking" the aqueous treatment fluid means reducing the viscosity of the aqueous treatment fluid. Breaking typically occurs due to the degradation, breakdown or decomposition of the polymer in the aqueous treatment fluid. For example, the polymer may decompose into smaller compounds, or the crosslink density of the polymer may be reduced, or the molecular weight of the polymer may be lowered, causing the viscosity of the aqueous treatment fluid to be reduced.

As used herein, "breaking temperature" refers to the temperature or temperatures at which breaking occurs, i.e., one or more temperatures between about 90° F. and about 300° F., or between about 100° F. and about 280° F., or between about 170° F. and about 230° F., or between about 180° F. and about 250° F., or between about 200° F. and about 240° F.

As used herein, "room temperature" refers to about 20° C. to about 30° C. (about 68° F. to about 86° F.), more preferably about 25° C. (about 77° F.).

As used herein, unless specified otherwise, the values of the constituents or components of the compositions are expressed in weight percent or percent by weight of each ingredient in the composition.

After fracturing has been completed at high temperatures, highly viscous aqueous treatment fluids need to be degraded by a breaker to allow the gas or oil to flow from the fractured rock that is propped open by a proppant. A common problem with breakers is that the aqueous treatment fluid typically "reheals" or gains viscosity when cooled. There is a need for breakers that prevent or inhibit rehealing of fracturing fluids in subterranean treatment operations when the temperature is reduced, so that the fluids can be efficiently drawn back through the fractures to the surface.

One aspect of the present invention relates to a breaker composition for use in an aqueous treatment fluid, the breaker composition comprising, consisting essentially of, or consisting of water; at least one peroxide; and optionally at least one alcohol. After the viscosity of an aqueous treatment fluid has been maintained at a relatively high level for a certain period of time in order to carry out the desired amount of fracturing in a subterranean formation and/or to deposit proppant in the fractures, the breaker composition then "breaks" the aqueous treatment fluid, e.g., by degrading the polymer (or "gelling agent") in the fracturing fluid, at a breaking temperature of 90-300° F. After the temperature of the aqueous treatment fluid is subsequently reduced to a temperature below the breaking temperature (e.g., after the temperature is reduced by 10° F., or 20° F., or 30° F., or 40° F., or 50° F., or 60° F., or 70° F., or 80° F., or 90° F., or 100° F., or 110° F., or 120° F., or 130° F., or 140° F., or 150° F., or 160° F., or 170° F., or 180° F., or 190° F., or 200° F., or more, below the breaking temperature), the breaker compositions of the present invention are able to maintain, or substantially maintain, the reduced viscosity of the "broken" aqueous treatment fluid for a period of time, such that no, or substantially no rehealing is observed, or only partial rehealing is observed.

The concentration of peroxide(s) in the breaker composition may be selected and controlled so as to impart the desired "break" characteristics and profile for a particular downhole fracturing operation or situation. In particular, the peroxide is present in an amount effective to reduce the viscosity of the aqueous treatment fluid when it has a "breaking temperature" of between 90° F. to 300° F. The aqueous treatment fluids may be formulated such that a break in the viscosity of the aqueous treatment fluid is exhibited within the "breaking temperature" range of from about 90° F. to about 300° F., or from about 100° F. to about 280° F., or from about 170° F. to about 230° F., or from about 180° F. to about 250° F., or from about 200° F. to about 240° F. in various embodiments of the invention. According to particular embodiments, the aqueous treatment fluid has an initial ("pre-break") viscosity in the range of about 1,000 centipoise (cP) to about 3,500 cP prior to being broken by the breaker composition. Breaking occurs at one or more "breaking temperatures" in the range of 90-300° F. (e.g., one or more temperatures in the range of 100-280° F., or 170-230° C., or 180-250° F., or 200-240° F.). Breaking results in a reduced "post-break" viscosity of the aqueous treatment fluid of about zero cP to about 250 cP, or about 0.1 cP to about 250 cP, or zero cP to about 125 cP, or about 0.1 cp to about 125 cP, or zero cP to about 75 cP, or about 0.1 cP to about 75 cP, or zero cP to about 10 cP, or about 0.1 cP to about 10 cP, or about 0.2 cP to about 10 cP at 40 $sec^{-1}$(constant shear rate) after the breaker composition has caused the aqueous treatment fluid to have a reduction in viscosity. Viscosity is preferably determined in accordance with API RP 39 ("Recommended Practices on Measuring the Viscous Properties of a Cross-Linked Water-Based Fracturing Fluid," API Recommended Practice 39, $3^{rd}$ Edition, May 1998), which is incorporated by reference herein.

The peroxide(s) in the breaker composition may include any peroxide effective for reducing the viscosity of the aqueous treatment fluid. The peroxide(s) may be a hydrogen peroxide, inorganic peroxide and/or organic peroxide. In one aspect of the invention, the peroxide is a room temperature stable organic peroxide (i.e., an organic peroxide which does not exhibit significant degradation or decomposition when stored at 25° C. in the absence of substances other than inert solvents). In another aspect, the peroxide is water soluble. The peroxide may have a water solubility greater than 1 g/100 g water at room temperature and pressure. For example, the peroxide may have a water solubility between 3 g/100 g water and 18 g/100 g water, or between 5 g/100 g water and 18 g/100 g water, or between 5 g/100 g water and 10 g/100 g water, or between 3 g/100 g water and 10 g/100 g water, or between 3 g/100 g water and 5 g/100 g water, at room temperature and pressure. The solubility can be measured by using an iodometric titration such as that described by Arthur Vogel in Vogel's Textbook of Quantitative Chemical Analysis, 5th ed., § 10.110, 384-87, Longman Scientific & Technical 1989. Preferably, the peroxide is both water soluble and stable at room temperature.

According to particular embodiments, the breaker composition includes between 0.1 to 20%, and preferably 1% and 10% peroxide in water. For example, the breaker composition may include between 2% and 10% peroxide, or between 2% and 8% peroxide, or between 3% and 8% peroxide, or between 4% and 8% peroxide, or between 4% and 7% peroxide, or about 5% peroxide in water.

Suitable peroxides include, for example, diacyl peroxides, peroxyesters, monoperoxycarbonates, peroxyketals, hydroperoxides (including alkyl hydroperoxides and aryl hydroperoxides), peroxydicarbonates, ketone peroxides, endoperoxides, and dialkyl peroxides. Combinations of different peroxides, including combinations of different organic peroxides, may be utilized.

Suitable peroxyesters may include, without limitation: di-tert-butyl diperoxyphthalate; di-tert-amyl diperoxyphthalate; tert-butyl peroxybenzoate; tert-amyl peroxybenzoate; tert-butyl peroxyacetate; tert-amyl peroxyacetate; 2,5-di (benzoylperoxy)-2,5-dimethylhexane; tert-butyl peroxymaleate; tert-amyl peroxymaleate; tert-butyl peroxy-2-ethylhexanoate; tert-butyl peroxyisobutyrate; tert-amyl peroxyisobutyrate; di(tert-butylperoxy)fumarate; tert-butyl peroxy(2-ethylbutyrate); tert-butyl peroxy-2-ethylhexanoate; tert-amyl peroxy-2-ethylhexanoate; 2,5-di(2-ethylhexanoylperoxy)-2,5-dimethylhexane; t-butyl peroxy 3,5,5-trimethylhexanoate; t-amyl peroxy 3,5,5-trimethylhexanoate; 1,1-dimethyl-3-hydroxy-butylperoxy-2-ethylhexanoate; tert-butylperoxy-3-carboxypropionate; tert-amylperoxy-3-carboxypropionate; 3-hydroxy-1,1-dimethylbutyl 2-ethyl-peroxyhexanoate; and combinations thereof.

Suitable monoperoxycarbonates may include, for example: OO-tert-butyl-O-(isopropyl) monoperoxycarbonate; OO-tert-amyl-O-(isopropyl)monoperoxycarbonate;

OO-tert-butyl-O-(2-ethylhexyl)monoperoxycarbonate; OO-tert-amyl-O-(2-ethylhexyl)monoperoxycarbonate; polyether poly(OO-tert-butyl monoperoxycarbonate); OO-t-butyl-O-polycaprolactone monoperoxy carbonate; 2,5-dimethyl-2,5-bis(isopropoxycarbonyl-peroxy)hexane; 2,5-dimethyl-2,5-bis(isopropoxycarbonyl-peroxy)hexyne-3; and combinations thereof.

Suitable peroxyketals may include, for example: 1,1-di (tert-butylperoxy)-3,3,5-trimethylcyclohexane; 1-tert-amylperoxy-1-methoxy cyclohexane; 1-tert-butylperoxy-1-methoxy cyclohexane; 1,1-di(tert-butylperoxy)cyclohexane; 1,1-di(tert-amylperoxy)cyclohexane; n-butyl-4,4-di(tert-butylperoxy)valerate; 4,4-bis(tert-butylperoxy)valeric acid; ethyl-3,3-di(tert-amylperoxy)butanoate; ethyl-3,3-di(tert-butylperoxy)butanoate; ethyl-3,3-di(tert-butylperoxy)butyrate; 2,2-di(tert-butylperoxy)butane; 2,2-di(tert-amylperoxy)butane; 2,2-di(tert-butylperoxy)propane; 2,2-di(tert-amylperoxy)propane; 2,2-di(tert-butylperoxy)4-methylpentane; 2,2-bis(4,4-di[tert-amylperoxy]cyclohexyl) propane; and combinations thereof.

Suitable diacyl peroxides may include, for example: didecanoyl peroxide; dilauroyl peroxide; dibenzoyl peroxide; di(methyl benzoyl)peroxide; 2,4-dichlorobenzoyl peroxide; and combinations thereof.

Suitable ketone peroxides may include, for example: 2,4-pentanedione peroxide; methyl ethyl ketone peroxide; methyl isobutyl ketone peroxide; and mixtures thereof.

Suitable hydroperoxides may include, for example: 2,5-dihydroperoxy-2,5-dimethylhexane; cumene hydroperoxide; t-butyl hydroperoxide; t-amyl hydroperoxide; t-octyl hydroperoxide; hydrogen peroxide ($H_2O_2$); 1,1,3,3-tetramethylbutyl hydroperoxide; para-methane hydroperoxide; diisopropylbenzene monohydroperoxide; diisopropylbenzene dihydroperoxide; and combinations thereof.

Suitable peroxydicarbonates may include, for example: di(4-tert-butylcyclohexyl)peroxydicarbonate; di(cyclohexyl)peroxydicarbonate; di(2-phenoxyethyl)peroxydicarbonate; dimyristyl peroxydicarbonate; dicetyl peroxydicarbonate; and combinations thereof.

Suitable dialkyl peroxides may include, for example: dicumyl peroxide; isopropenylcumyl cumyl peroxide; isopropylcumyl cumyl peroxide; m/p-di-tert-butylperoxydiisopropylbenzene (a,a'-bis(tert-butylperoxy)diisopropylbenzene); tert-butylperoxyisopropylbenzene (tert-butyl cumyl peroxide); m-isopropylolcumyl t-butyl peroxide (tert-butyl 3-isopropylolcumylperoxide); tert-butyl-3-isopropenylcumyl peroxide (m-isopropenylcumyl tert-butyl peroxide); tert-butyl-4-isopropenylcumyl peroxide; tert-butyl-3-isopropylcumyl peroxide; m/p-acetylcumyl t-butyl peroxide; 2,4-diallyloxy-6-tert-butylperoxide-1,3,5-triazine; 3,3,5,7,7-pentamethyl-1,2,4-trioxepane (e.g., TRIGONOX® 311); 3,6,9-triethyl-3,6,9-trimethyl-1,4,7-triperoxonane (e.g., TRIGONOX® 301); di-tert-butyl peroxide; 2-methoxy-2-tert-butylperoxy propane; di-tert-amyl peroxide; 2,5-dimethyl-2,5-di(tert-butylperoxy)hexane; 2,5-dimethyl-2,5-di(tert-amylperoxy)hexane; 2,5-dimethyl-2,5-di(tert-butylperoxy)hexyne-3; 1,3-dimethyl-3(t-butylperoxy)butyl N[1-{3-(1-methylethenyl)phenyl}1-methylethyl]carbamate; 4-(tert-amylperoxy)-4-methyl-2-pentanol; 4-(tert-butylperoxy)-4-methyl-2-pentanol; 3-(t-butylperoxy)-3-methyl-2-pentanone; 4-methyl-4-(tert-butylperoxy)-2-pentanone (e.g., LUPEROX® 120); 1-methoxy-1-tert-butylperoxy cyclohexane; 2,4,6-tri(tert-butylperoxy)triazine; tert-butyl-1,1,3,3-tetramethylbutyl peroxide; 3-methyl-3-(tert-butylperoxy)-2-butanol (e.g., LUPEROX® 240); 3-methyl-3(tert-amylperoxy)-2-butanol (e.g., LUPEROX® 540); and combinations thereof.

According to particular embodiments, the peroxide in the breaker composition of the present invention comprises, consists essentially of, or consists of tert-butyl hydroperoxide. According to these embodiments, the breaker composition preferably may comprise, consist essentially of, or consist of water and tert-butyl hydroperoxide.

Alternatively, the breaker composition preferably may comprise, consist essentially of, or consist of water, tert-butyl hydroperoxide, and at least one alcohol (e.g., preferably propylene glycol, a butyl alcohol, such as tert-butyl alcohol, or a combination thereof) and/or at least one saccharide (e.g., preferably monosaccharides and di-saccharides such as fructose and sucrose). Without being bound by any theory, it is believed that when one or more alcohols are included in the breaker composition, the alcohol(s) and/or saccharides aid in preventing rehealing of the aqueous treatment fluid, i.e., they help maintain a reduction in viscosity of the aqueous treatment fluid after the temperature of the aqueous treatment fluid is reduced from the breaking temperature of 90-300° F. (e.g., 100-280° F. or 170-230° C. or 180-250° F. or 200-240° C.) to a temperature below the breaking temperature (e.g., after the breaking temperature has been reduced to room temperature).

As used herein, an "amount of rehealing" refers to the percentage of the pre-break viscosity that the aqueous treatment recovers after it has been broken and the temperature has been reduced to below the breaking temperature (e.g., after the temperature has been reduced to room temperature). Stated another way, the amount of rehealing refers to the increase in viscosity of the aqueous treatment fluid after (i) it has been broken at a breaking temperature of 90° F. to 300° F. (e.g., 100-280° F. or 170-230° C. or 180-250° F. or 200-240° C.) and (ii) the temperature has been subsequently reduced to a temperature below the breaking temperature (e.g., after the breaking temperature has been reduced to room temperature) for a period of time, relative to the viscosity of the aqueous treatment fluid "pre-break," i.e., prior to being broken at 90-300° F. (e.g., 100-280° F. or 170-230° C. or 180-250° F. or 200-240° C.). For example, if the "pre-break" viscosity is 500 centipoise, the "post-break" viscosity is 10 centipoise, and the viscosity after the temperature is reduced to below the breaking temperature is 60 centipoise, then the amount of rehealing is (60−10)/500=10%. If there is no increase in viscosity after the aqueous treatment fluid has been broken at a temperature of 90° F. to 300° F. and the temperature has been subsequently reduced for a period of time, then there is no rehealing.

The amount of rehealing that is observed when the breaker composition includes at least one alcohol (e.g., propylene glycol and/or tert-butyl alcohol) is less than the amount of rehealing that is observed with breaker compositions that do not include at least one alcohol (e.g., propylene glycol and/or tert-butyl alcohol). According to particular embodiments, the breaker composition causes the aqueous treatment fluid to maintain the same "post-break" viscosity of about 0.2 cP to about 10 cP for a period of time at room temperature (e.g., for at least 10 minutes, at least 30 minutes, at least one hour, at least three hours, at least six hours, at least twelve hours, or at least 24 hours). This means that the breaker composition may completely prevent any rehealing from occurring such that no re-healing is observed for this period of time. According to other embodiments, the breaker composition substantially prevents rehealing of the aqueous treatment fluid (i.e., only "partial rehealing" is observed), which means the amount of rehealing observed in the aqueous treatment fluid is about 0.1% to about 60%, or about 0.1% to about 50%, or about 0.1% to about 40%, about 0.1% to about 30%, about 0.1% to about 20%, or about 0.1% to about 15%, or about 0.1% to about 10%, or about 0.1% to about 5%, or about 0.1% to about 1%.

As described in Example 1 below, no rehealing of an aqueous treatment fluid was observed when a breaker composition of the present invention included water, tert-butyl hydroperoxide, and propylene glycol. As described in Example 2 below, partial rehealing inhibition of an aqueous treatment fluid was observed when a breaker composition of the present invention included water and tert-butyl hydroperoxide.

According to particular embodiments, the breaker composition does not include ethylene glycol. According to additional embodiments, the amount of rehealing that is observed when the alcohol in the breaking composition comprises, consists essentially of, or consists of propylene glycol is less than the amount of rehealing that is observed when the breaking composition is the same except that it includes ethylene glycol instead of propylene glycol (e.g., at least 50% less, or at least 60% less, or at least 70% less, or at least 80% less, or at least 90% less).

Suitable alcohols may include, for example, glycols and/or butyl alcohols and/or triols (e.g., glycerol) and/or monosaccharides and/or disaccharides (e.g. fructose and sucrose). In one aspect of the invention, the alcohol is water soluble. The alcohol may be a mono-alcohol (containing one hydroxyl group per molecule) and/or a polyalcohol such as a glycol (containing two or more hydroxyl groups per molecule) and/or a triol (e.g., glycerol).

According to particular embodiments, the breaker composition includes between 0.01% and 5% alcohol(s), or between 0.1% and 5% alcohol(s), or between 0.1% and 3% alcohol(s), or between 0.5% and 5% alcohol(s), or between 0.5% and 3% alcohol(s), or between 0.5% and 2% alcohol(s), or between 0.5% and 1.5% alcohol(s), or between 0.5% and 1% alcohol(s), or about 1% alcohol(s), or about 0.95% alcohol(s) in water. According to further embodiments, the breaker composition includes between 5% and 30% alcohol(s) relative to the peroxide(s), or between 10% and 30%, or between 10% and 25%, or between 15% and 25%, or between 15% and 20%, or between 20% and 30%, or between 20% and 25% relative to the peroxide(s).

According to particular embodiments, the alcohol(s) included in the breaker composition are selected from the group consisting of glycols, butyl alcohols, triols, higher polyols, monosaccharides, disaccharides and a combination thereof. Alternatively, the alcohol(s) comprise, consist essentially of, or consist of propylene glycol and/or butyl alcohol(s) (e.g., t-butyl alcohol). According to these embodiments, the breaker composition may comprise, consist essentially of, or consist of water; at least one peroxide (e.g., tert-butyl hydroperoxide); and at least one alcohol selected from the group consisting of propylene glycol, a butyl alcohol (e.g., tert-butyl alcohol), and a combination thereof.

According to particular embodiments, the breaker composition comprises, consists essentially of, or consists of:
  water in an amount of 85% to 98% (e.g., 88% to 95% or 92% to 96%),
  at least one peroxide (e.g., tert-butyl hydroperoxide) in an amount of 1% to 10%, and
  optionally at least one alcohol (e.g., propylene glycol and/or tert-butyl alcohol) in an amount of 0.01 to 5%.

According to particular embodiments, the breaker composition further comprises acetone.

In alternative embodiments, the breaker composition includes acetone and does not include any alcohols, such that the breaker composition comprises, consists essentially of, or consists of water, at least one peroxide (e.g., tert-butyl hydroperoxide), and acetone.

According to particular embodiments, the breaker composition is not in the form of an oil-in-water or water-in-oil emulsion, i.e., the breaker composition is in a non-emulsified form. For example, in certain embodiments the breaker composition is not a microemulsion or nanoemulsion.

Another aspect of the present invention relates to an aqueous treatment fluid that has been combined with a breaker composition. According to a particular embodiment, an aqueous treatment fluid comprises, consists essentially of, or consists of:
  water;
  a gelling agent;
  a crosslinking agent; and
  any embodiment of the breaker compositions described herein, e.g., a breaker composition that comprises, consists essentially of, or consists of:
    water;
    at least one peroxide (e.g., tert-butyl hydroperoxide); and
    optionally at least one alcohol (e.g., propylene glycol and/or tert-butyl alcohol).

The at least one peroxide and the at least one optional alcohol are present in amounts effective to reduce the viscosity of the aqueous treatment fluid at a temperature of 90-300° F. (e.g., 100-280° F. or 180-250° F.), and to maintain a reduced viscosity for a period of time after the temperature is reduced from 90-300° F. (e.g., to room temperature).

In various embodiments of the invention, the breaker composition is included in the aqueous treatment fluid in an amount of about 0.05 GPT (Gallons Per Thousand) to about 10 GPT peroxide, about 0.1 GPT to about 5 GPT peroxide, or about 0.2 GPT to about 2 GPT peroxide, or about 1.0 GPT peroxide.

The aqueous treatment fluid includes at least one gelling agent, i.e., a polymer capable of functioning as a viscosifying agent to thicken the aqueous treatment fluid. Suitable gelling agents generally are of high molecular weight and increase the viscosity of the aqueous treatment fluid to facilitate formation of the fractures and transport of the proppant into the fractures. The concentration of gelling agent(s) in the aqueous treatment fluid may be selected and controlled so as to impart to the fluid the viscosity and other rheological characteristics desired or needed for a particular end-use application. In various embodiments of the invention, for example, the gelling agent(s) are included in the aqueous treatment fluid in an amount of about 5 GPT to about 15 GPT gelling agent(s), or about 6 GPT to about 14 GPT gelling agent(s), or about 8 GPT to about 12 GPT gelling agent(s), or about 10 GPT gelling agent(s).

Suitable gelling agents include hydratable polysaccharides, polyacrylamides, polyacrylamide copolymers, polylactic acid, and polyvinyl alcohol. Hydratable polysaccharides may include galactomannan gums and derivatives thereof, glucomannan gums and derivatives thereof, and cellulose derivatives. Examples of such compounds are guar gum, locust beam gum, karaya gum, sodium carboxymethylguar, hydroxyethylguar, sodium carboxymethylhydroxyethylguar, hydroxypropylguar, sodium carboxymethylhydroxymethylcellulose, sodium carboxymethylhydroxyethylcellulose, carboxymethylguar (CMG), carboxymethylhydroxypropylguar (CMHPG), and hydroxyethylcellulose.

In one embodiment, the gelling agent is selected from the group consisting of polysaccharides, polysaccharide derivatives, polyacrylates, polyacrylamides, acrylamide methyl propane sulfonic acid copolymers, polyvinyl alcohols, polylactic acids, polyvinyl pyrrolidones, maleic anhydride methyl vinyl ether copolymers, and polyethylene oxides. In an exemplary embodiment of the present invention, the gelling agent in the aqueous treatment fluid may include functionalized guar derivatives, guar gum, and combinations thereof. Any suitable gelling agent may be used, whether water soluble or insoluble. In an exemplary embodiment, however, the gelling agent is water soluble or water swellable. A single gelling agent may be used or a combination of gelling agents may be used in the aqueous treatment fluid. For example, the guar type (water soluble) and polyacrylamide type (water resistant) polymers may be used in combination. Any suitable ratio of polymers may be used to achieve the desired viscosity.

Crosslinking agents or other additives may also be included in the aqueous treatment fluid to increase the viscosity. Crosslinking agents useful for increasing the viscosity of gelling agents utilized in fracturing fluids are well known in the art (e.g., borate, zirconium, aluminum, titanium, and chromium-containing crosslinkers). In one embodiment of the invention, the gelling agent is a polysaccharide crosslinked with at least one crosslinker selected from the group consisting of borate, zirconium, aluminum, titanium, and chromium-containing crosslinkers. For example, a guar or derivatized guar polymer may be crosslinked with either borates (boric acid) or zirconium compounds or both. The crosslinking agent may or may not possess time-delayed crosslinking capabilities. For example, the crosslinking agent may be a latent crosslinking agent which is only activated when exposed to certain conditions, e.g., an elevated temperature. Preferred crosslinking agents include borate and zirconate crosslinkers. In various embodiments of the invention, the crosslinking agent is included in the aqueous treatment fluid in an amount of about 0.5 GPT to about 10 GPT gelling agent, or about 1 GPT to about 8 GPT gelling agent, or about 1 GPT to about 5 GPT gelling agent, or about 2 GPT to about 4 GPT gelling agent, or about 3 GPT gelling agent.

According to particular embodiments, the aqueous treatment fluid also includes at least one pH adjuster, such as one or more acids, bases, buffers, etc. According to particular embodiments, the pH adjuster comprises, consists essentially of, or consists of sodium hydroxide (e.g., 25% NaOH in water). According to additional embodiments, the pH adjuster(s) include a high pH buffer (e.g., a buffer having a pH greater than 7). The pH adjuster(s) are preferably included in an amount effective to achieve a pH of the aqueous treatment fluid, prior to the addition of a crosslinking agent, that is greater than 7 and less than 13, more preferably about 9 to about 12, even more preferably about 9.5 to about 11 (e.g., when the aqueous treatment fluid includes water, guar viscosifying polymer, and a borate crosslinker, as described in Example 1 below). According to alternative embodiments, the pH of the aqueous treatment fluid prior to the addition of a crosslinking agent is between about 4 and about 5 (e.g., when the aqueous treatment fluid includes water, carboxymethylhydroxypropyl guar, and a zirconium crosslinker). For example, the pH adjuster may be included in the aqueous treatment fluid in an amount of about 0.05 GPT to about 10 GPT, about 0.1 GPT to about 5 GPT, or about 0.2 GPT to about 2 GPT, or about 1 GPT to about 2 GPT, or about 1.5 GPT.

The aqueous treatment fluid may include one or more proppants. The proppants or propping agents are carried by the aqueous treatment fluid and deposited in the cracks created by the hydraulic fracturing, so that they can keep the cracks propped open. The proppant remains in the produced fractures to prevent closure of the fractures and to form a channel extending from the wellbore into the formation once the fracturing fluid is recovered. Any suitable proppant(s), such as sand, a synthetic ceramic proppant, or a resin/polymer coated proppant, may be used, as is well known in the art.

The aqueous treatment fluid may include one or more "promoters" to promote or accelerate the degradation of the gelling agent. Suitable promoters may include any salt of a thiosulfate, wherein thiosulfate corresponds to the anionic chemical species $S_2O_3^{2-}$. Suitable promoters also include any salt of a sulfite, wherein sulfite corresponds to the anionic chemical species $SO_3^{2-}$, as well as any salt of a bisulfite, wherein bisulfite corresponds to the anionic chemical species $HSO_3^{-}$. Salts of erythorbic acid are also suitable for use as the promoter. Combinations of different types of such promoters may also be utilized. In one aspect of the invention, the promoter is water-soluble. The cation(s) associated with the anion of the promoter may, for example, be ammonium, alkali metal cations such as sodium or potassium cations, alkaline earth metal cations such as calcium cation, metal cations such as silver, iron, copper, cobalt, manganese, vanadium and the like and combinations thereof. Illustrative examples of specific thiosulfate salts useful in the present invention include, but are not limited to, sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, and combinations thereof. Sodium sulfite, sodium bisulfite and sodium erythorbate are also suitable for use as promoters in the present invention. Sodium thiosulfate is preferred. The promoter may, for example, be incorporated into the aqueous treatment fluid as a conventional solid salt, as a polymer-encapsulated/coated (time-release) solid salt, salts with non-polymeric coatings, or as a concentrated aqueous salt solution.

The concentration of promoter such as thiosulfate salt in the aqueous treatment fluid may be selected and controlled so as to achieve the desired level of promotion with respect to the peroxide. In one aspect of the invention, an amount of promoter such as thiosulfate salt is present in the aqueous treatment fluid which is effective to lower the break temperature of the aqueous treatment fluid as compared to the break temperature exhibited by the aqueous treatment fluid in the absence of such promoter. The incorporation of one or more promoters in an aqueous treatment fluid in accordance with the present invention thus may effectively extend or expand the useful working temperature range of a breaker composition. The promoters can also or alternatively reduce the break time at a given temperature.

Typically, the aqueous treatment fluid will be formulated to contain, in various embodiments of the invention, from about 0.001% to about 10%, about 0.002% to about 5%, about 0.005% to about 2.5%, or about 0.01% to about 1.5% of total promoter. Alternatively, the aqueous treatment fluid may contain about 0.1 GPT to about 8 GPT, or about 1 GPT to about 6 GPT, or about 2 GPT to about 5 GPT promoter.

Another aspect of the present invention relates to a method for maintaining a reduction in viscosity of an aqueous treatment fluid (i.e., a method for completely or substantially preventing reheating of an aqueous treatment fluid) that comprises, consists essentially of, or consists of combining a breaker composition with the aqueous treatment fluid, wherein the breaker composition (i) reduces the viscosity of the aqueous treatment fluid at a temperature of 90-300° F. (e.g., 100° F. to 280° F. or 180° F. to 250° F.), and (ii) enables the aqueous treatment fluid to maintain the reduced viscosity for a period of time after the temperature is reduced from 90-300° F. (e.g., to room temperature). Stated another way, the method comprises incorporating the breaker composition into the aqueous treatment fluid in an amount effective to cause a reduction in viscosity of the aqueous treatment fluid at a temperature between 90° F. to 300° F. (e.g., 100° F. to 280° F. or 180° F. to 250° F.), and to maintain the reduction in viscosity of the aqueous treatment fluid (i.e., to entirely or substantially prevent the aqueous treatment fluid from rehealing) for a period of time after the temperature of the aqueous treatment fluid has been reduced (e.g., for at least five minutes, at least 15 minutes, at least 30 minutes, at least one hour, at least three hours, at least six hours, at least twelve hours, or at least 24 hours). Any embodiments of the breaker composition and aqueous treatment fluid described herein may be used in accordance with this method (e.g., an aqueous treatment fluid comprising a gelling agent and a crosslinking agent, and a breaking composition comprising, consisting essentially of, or consisting of water, tert-butyl hydroperoxide, and optionally propylene glycol).

According to particular embodiments, the breaker composition completely prevents any rehealing from occurring and no re-healing is observed for the period of time. According to other embodiments, the breaker composition substantially prevents rehealing of the aqueous treatment fluid (i.e., the amount of rehealing observed in the aqueous treatment fluid is about 0.1% to about 20%, or about 0.1% to about 15%, or about 0.1% to about 10%, or about 0.1% to about 5%, or about 0.1% to about 1%).

Another aspect of the present invention relates to a method for fracturing a subterranean formation comprising, consisting essentially of, or consisting of injecting into the subterranean formation under fracturing conditions, an aqueous treatment fluid and breaker composition of the present invention. The aqueous treatment fluid and breaker composition may be injected simultaneously (e.g., the aqueous treatment fluid that has already been combined with the breaker composition prior to injection), or separately (e.g., wherein the aqueous treatment fluid is injected into the formation, followed by the breaker composition or vice versa). The aqueous treatment fluid is supplied to a desired location in a subterranean formation and the aqueous treatment fluid is maintained with sufficient viscosity to form at least one fracture. The breaker composition is allowed to degrade the gelling agent and reduce the viscosity of the aqueous treatment fluid at a temperature of 90-300° F. (e.g., 100° F. to 280° F. or 180° F. to 250° F.). After the temperature is reduced (e.g., to room temperature), the breaker composition enables the aqueous treatment fluid to maintain its reduced viscosity. Any embodiments of the breaker composition and aqueous treatment fluid described herein may be used in accordance with this method.

The embodiments described herein are intended to be exemplary of the invention and not limitations thereof. One skilled in the art will appreciate that modifications to the embodiments and examples of the present disclosure may be made without departing from the scope of the present disclosure.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

Unless specified otherwise, all values provided herein include up to and including the starting points and end points given.

The following examples further illustrate embodiments of the invention and are to be construed as illustrative and not in limitation thereof.

EXAMPLES

Aqueous treatment fluids were prepared as described in the Examples below. Viscosity was measured in accordance with API RP 39 ("Recommended Practices on Measuring the Viscous Properties of a Cross-Linked Water-Based Fracturing Fluid," API Recommended Practice 39, $3^{rd}$ Edition, May 1998), except that the shear rate was 40 $s^{-1}$ and the volume of the fluid was 52 mL.

Example 1

In accordance with the present invention, an aqueous treatment fluid was prepared using 500 mL water, 10 GPT (Gallons Per Thousand) guar viscosifying polymer slurry, 1.5 GPT 25% NaOH in water, 3 GPT delayed borate crosslinker and 1.0 GPT of 5 wt % t-butyl hydroperoxide combined with 0.95 wt % propylene glycol in water. The aqueous treatment fluid formulation was prepared and evaluated in accordance with the following procedure: The water was added to a wide mouth glass jar with overhead mixer at 730 rpm. The guar viscosifying polymer slurry was added via a 5 mL syringe and allowed to stir for 10 minutes. The NaOH solution was added to bring the pH to 10.5. The delayed borate crosslinker was then added, followed by the 5 wt % t-butyl hydroperoxide, and allowed to mix for 1 minute. After the aqueous treatment fluid was prepared, 52 mL was transferred to a Grace M5600 sample cup via a syringe. Following a successful break test at 230° F. and a shear rate of 40 $sec^{-1}$, the aqueous treatment fluid was allowed to cool from 86° F. to 68° F. while examining the effect of increasing viscosity (often called reheal) by testing in a Grace M5600 using a constant shear rate of 40 $sec^{-1}$.

The combination of 1 GPT of 5 wt % t-butyl hydroperoxide and 0.95 wt % PG (propylene glycol) resulted in a complete break in guar fluid viscosity after 50 minutes at 230° F., see FIG. 1. Cooling this broken guar fluid from 86° F. to 68° F. and measuring its viscosity in the Grace M5600 at 40 $sec^{-1}$, reveals desirable low (near zero centipoise viscosity). See FIG. 1A. This demonstrates that no rehealing of the broken guar based fracture fluid had taken place. Complete inhibition of rehealing is more desirable than partial rehealing, and even more desirable than complete rehealing of an aqueous treatment fluid.

Example 2

A second sample was prepared following the same procedure as Example 1, except that propylene glycol was not included with the 5 wt % t-butyl hydroperoxide breaker. This breaker consisting of a 5 wt % solution of t-butyl hydroperoxide provided an unexpected partial reheal of the guar fluid, which is a desirable result compared to the complete reheal of the guar fluid after a complete break when using ammonium persulfate in Example 3. The use of 5 wt % t-butyl hydroperoxide provided an advantage, and a desirable outcome compared to the ammonium persulfate breaker.

Figure 2:
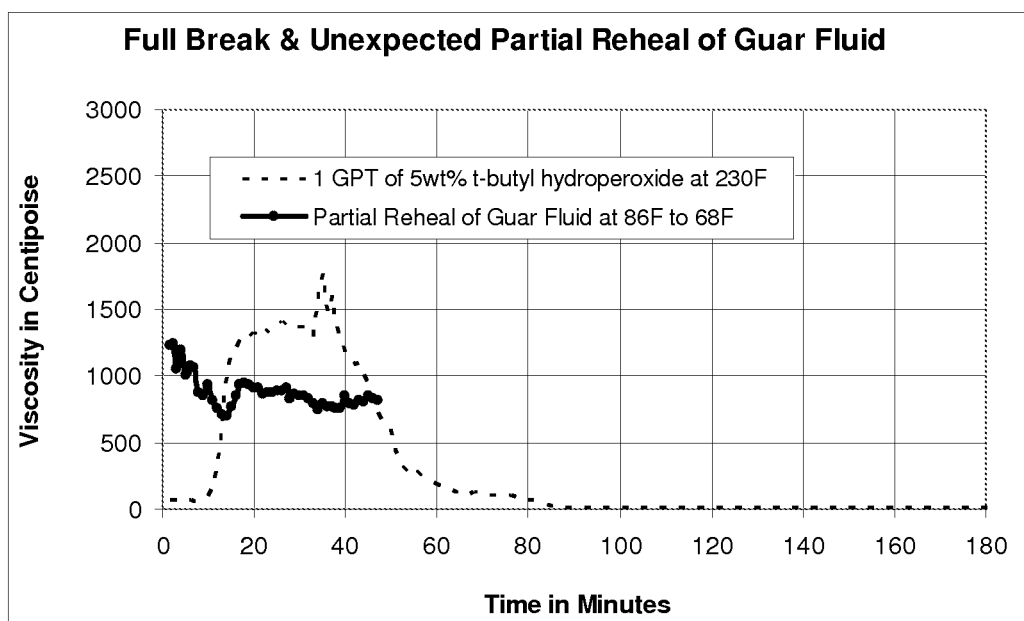

From FIG. 2, it can be seen that at 230° F., the guar viscosity provided a final viscosity of about zero centipoise after 90 minutes. However, after cooling this broken guar fluid from 86° F. to 68° F., the fluid viscosity partially recovered from zero cps to approximately 750 centi-poise, or about half of the original viscosity of >1500 cps. This was an unexpected and desirable result when using 5 wt % t-butyl hydroperoxide solution compared to the use of a solid ammonium persulfate, which resulted in a complete rehealing of the guar based fracture fluid in Example 3.

Example 3

Figure 3:
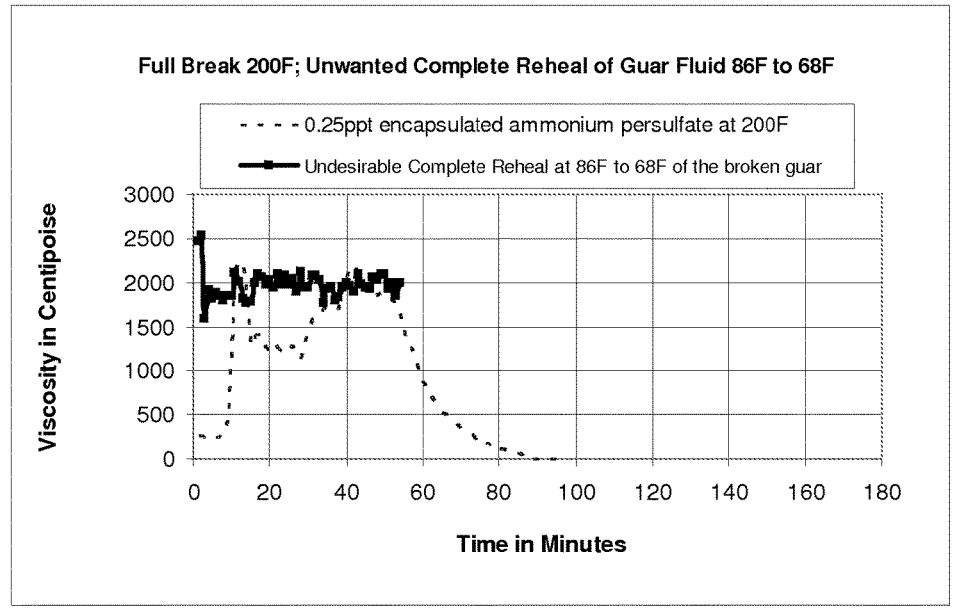

A third sample was prepared following the same procedure as Example 1, except that 0.255 PPT (pounds per thousand gallons of fluid) of a solid inorganic peroxide, ammonium persulfate, was used as the breaker. The ammonium persulfate breaker was not used with any propylene glycol or t-butyl hydroperoxide. Results using the sample of Example 3 are shown in FIG. 3.

After reacting the guar fracture fluid at 200° F. for 90 minutes a complete break of the high viscosity guar fluid was obtained where the final measured viscosity shows a zero centipoise viscosity after 90 minutes. Cooling this broken, low viscosity fluid from 200° F. down to the 86° F. to 68° F. range, and then remeasuring this broken fluid, revealed that the ammonium persulfate breaker provided poor performance. The cooled fluid, which was broken at 200° F. to a desirable zero centipoise, completely rehealed, i.e., regained all of the original viscosity of about 2000 centipoise, when cooled to room temperature. Thus, the final measured viscosity of the room temperature broken fluid was no different than the original viscosity prior to using the ammonium persulfate breaker. The guar based fluid recovered its original high viscosity, which is undesirable, making it more difficult to handle the fluid when attempting to remove broken fluid from a well.

Example 4

Figure 4:
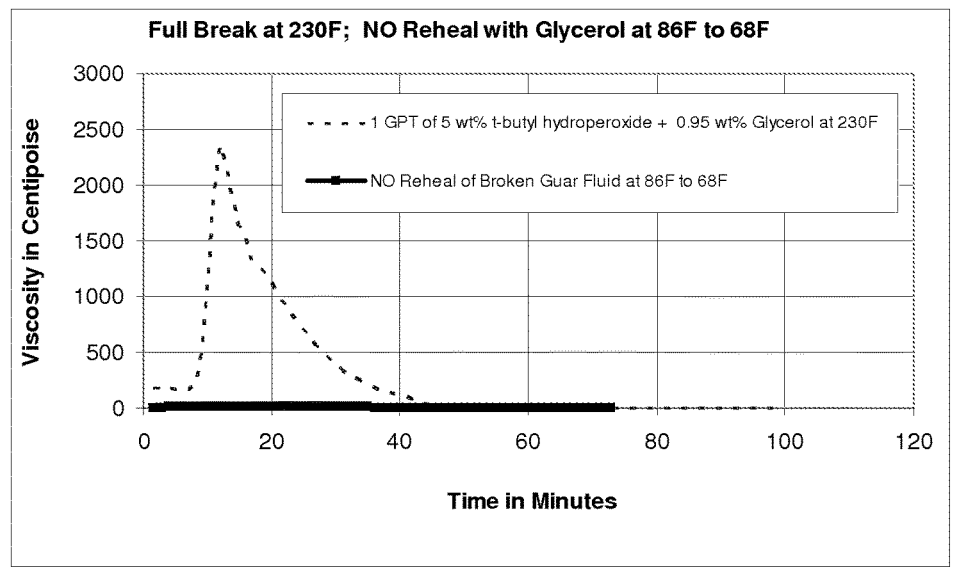
FIGS. 4-7 pertain to Examples 4-7, respectively.

A fourth sample was prepared following the same procedure as Example 1, except that the use of 0.95 wt % propylene glycol was eliminated and replaced by 0.95 wt % glycerol which was combined with the 5 wt % t-butyl hydroperoxide breaker. Results are shown in FIG. 4. A complete break of the guar based fluid was obtained at 230° F. Cooling this completely broken fluid from 230° F. down to 86° F.-68° F. range and measuring the cooled fluid viscosity again, as per the procedure outlined in Example 1 at a 40 sec$^{-1}$ shear rate, showed no rehealing of the guar fluid.

Example 5

Figure 5:
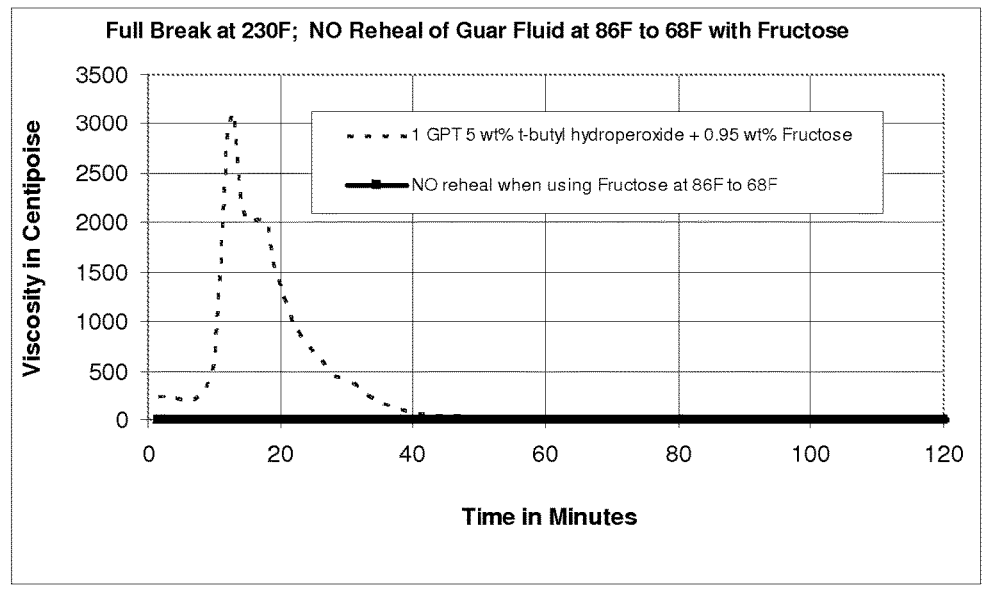

A fifth sample was prepared following the same procedure as Example 1, except that the use of 0.95 wt % propylene glycol was eliminated and replaced by 0.95 wt % fructose which was combined with the 5 wt % t-butyl hydroperoxide breaker. Results are shown in FIG. 5. A complete break of the guar based fluid was obtained at 230° F. Cooling this completely broken fluid from 230° F. down to 86° F.-68° F. range and measuring the cooled fluid viscosity again, as per the procedure outlined in Example 1 at a 40 sec$^{-1}$ shear rate, showed no rehealing of the guar fluid.

Example 6

Figure 6:
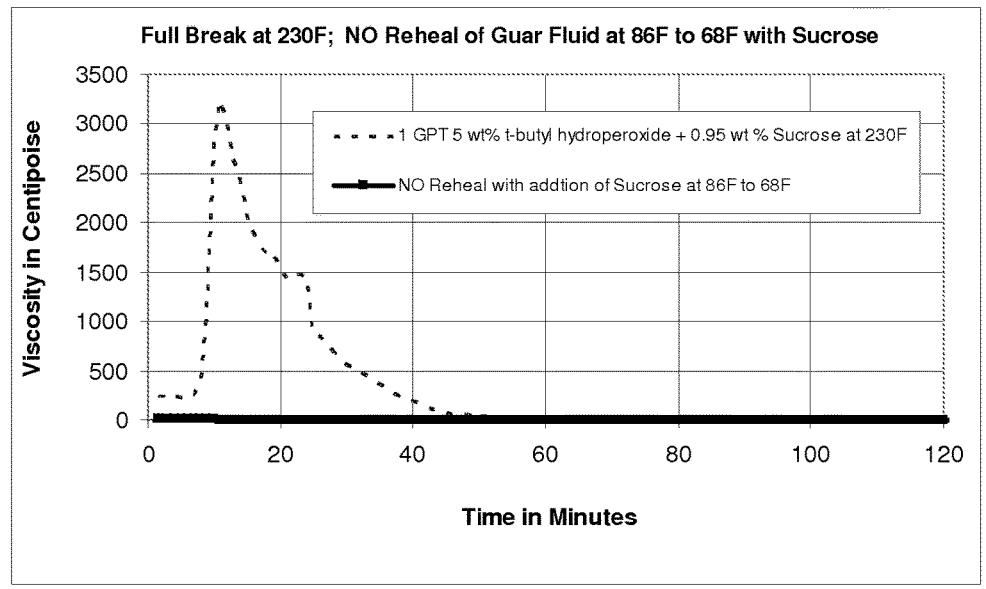

A sixth sample was prepared following the same procedure as Example 1, except that the use of 0.95 wt % propylene glycol was eliminated and replaced by 0.95 wt % sucrose which was combined with the 5 wt % t-butyl hydroperoxide breaker. Results are shown in FIG. 6. A complete break of the guar based fluid was obtained at 230° F. Cooling this completely broken fluid from 230° F. down to 86° F.-68° F. range and measuring the cooled fluid viscosity again, as per the procedure outlined in Example 1 at a 40 sec$^{-1}$ shear rate, showed no rehealing of the guar fluid.

Example 7

Figure 7:
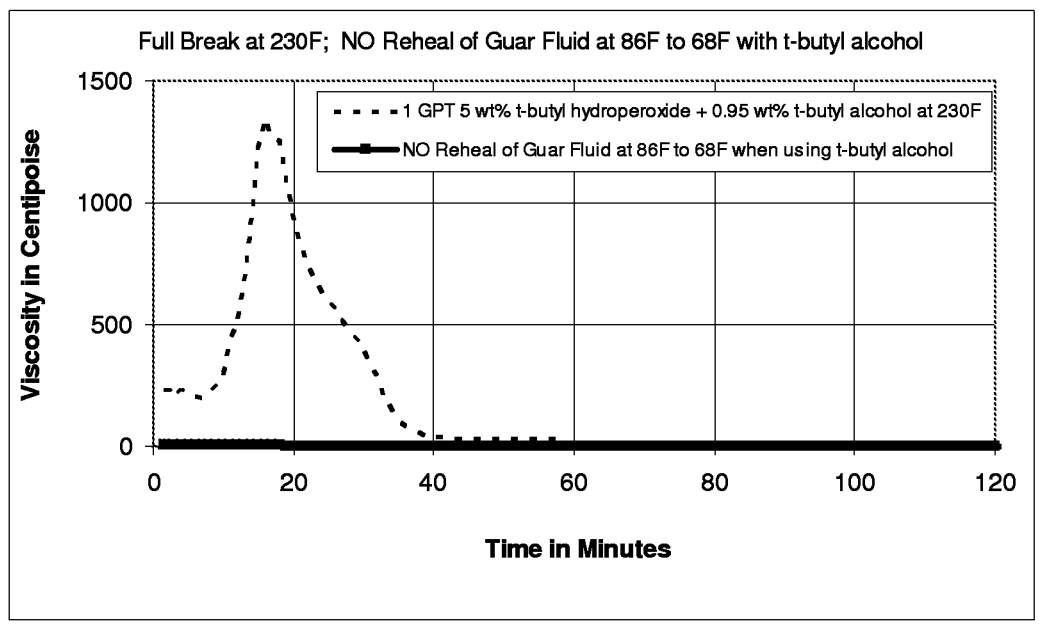

A seventh sample was prepared following the same procedure as Example 1, except that the use of 0.95 wt % propylene glycol was eliminated and replaced by 0.95 wt % t-butyl alcohol which was combined with the 5 wt % t-butyl hydroperoxide breaker. Results are shown in FIG. 7. A complete break of the guar based fluid was obtained at 230° F. Cooling this completely broken fluid from 230° F. down to 86° F.-68° F. range and measuring the cooled fluid viscosity again, as per the procedure outlined in Example 1 at a 40 sec$^{-1}$ shear rate, showed no rehealing of the guar fluid.

What is claimed is:

1. An aqueous non-emulsified breaker composition for use in an aqueous treatment fluid, the aqueous non-emulsified breaker composition comprising:
    water;
    at least one water soluble organic peroxide which is tert-butyl hydroperoxide,
    at least one alcohol selected from the group consisting of propylene glycol, a butyl alcohol, a monosaccharide, a disaccharide and a combination thereof,
    wherein the at least one water soluble organic peroxide and the at least one alcohol are present in an amount effective to reduce the viscosity of an aqueous treatment fluid at a temperature of 90-300° F., and to maintain a reduced viscosity for a period of time after the temperature is reduced from 90-300° F.

2. The aqueous non-emulsified breaker composition of claim 1, wherein the at least one organic peroxide and the at least one alcohol are present in an amount effective to maintain a reduced viscosity for a period of time after the temperature is reduced from 90-300° F. to room temperature.

3. The aqueous non-emulsified breaker composition of claim 1, further comprising acetone.

4. The aqueous non-emulsified breaker composition of claim 1, wherein the alcohol is propylene glycol.

5. The aqueous non-emulsified breaker composition of claim 1, wherein the alcohol is tert-butyl alcohol.

6. The aqueous non-emulsified breaker composition of claim 1, wherein the at least one organic peroxide has a water solubility of between 3 g/100 g to 18 g/100 g at room temperature and pressure.

7. The aqueous non-emulsified breaker composition of claim 1 comprising between 0.1% and 10% of tert-butyl hydroperoxide.

8. The aqueous non-emulsified breaker composition of claim 1 comprising between 0.1% and 5% of propylene glycol.

9. The aqueous non-emulsified breaker composition of claim 1 comprising between 85% and 98% of the water.

10. An aqueous treatment fluid comprising:
    water;
    at least one gelling agent;
    at least one crosslinking agent; and the aqueous non-emulsified breaker composition of claim 1.

11. The aqueous treatment fluid of claim 10 wherein the at least one gelling agent comprises a guar or derivatized guar polymer.

12. The aqueous treatment fluid of claim 10 wherein the at least one crosslinking agent is selected from the group consisting of borate crosslinkers, zirconium crosslinkers, aluminum crosslinkers, titanium crosslinkers, chromium organometallic crosslinkers and a combination thereof.

13. The aqueous treatment fluid of claim 10 further comprising a pH adjuster.

14. The aqueous treatment fluid of claim 10 further comprising a proppant.

15. The aqueous treatment fluid of claim 10 further comprising a promoter selected from the group consisting of sodium thiosulfate, potassium thiosulfate, ammonium thiosulfate, silver thiosulfate, iron thiosulfate, copper thiosulfate, cobalt thiosulfate, calcium thiosulfate, manganese thiosulfate, vanadium thiosulfate, sodium sulfite, sodium bisulfite, sodium erythorbate, and combinations thereof.

16. A method for maintaining a reduction in viscosity of an aqueous treatment fluid, said method comprising:
combining an aqueous non-emulsified breaker composition with the aqueous treatment fluid,
wherein the aqueous treatment fluid comprises at least one gelling agent and at least one crosslinking agent,
wherein the aqueous non-emulsified breaking composition comprises water; at least one water soluble organic peroxide which is tert-butyl hydroperoxide, and at least one alcohol selected from the group consisting of propylene glycol, a butyl alcohol, a monosaccharide, a disaccharide and a combination thereof,
wherein the aqueous non-emulsified breaker composition reduces the viscosity of the aqueous treatment fluid at a temperature of 90-300° F., and
wherein the aqueous non-emulsified breaker composition maintains a reduced viscosity of the aqueous treatment fluid for a period of time after the temperature is reduced from 90-300° F.

17. The method according to claim 16, wherein the aqueous non-emulsified breaker composition maintains the reduced viscosity of the aqueous treatment fluid for a period of time after the temperature is reduced from 90-300° F. to room temperature.

18. The method according to claim 16, wherein the at least one water soluble organic peroxide comprises tert-butyl hydroperoxide and the at least one alcohol comprises propylene glycol.

19. The method according to claim 16, wherein the at least one gelling agent comprises a guar or derivatized guar polymer, and the at least one crosslinking agent is selected from the group consisting of borate crosslinkers, zirconium crosslinkers, aluminum crosslinkers, titanium crosslinkers, chromium organometallic crosslinkers and a combination thereof.

20. A method for fracturing a subterranean formation comprising:
injecting into the subterranean formation under fracturing conditions an aqueous treatment fluid and an aqueous non-emulsified breaking composition,
wherein the aqueous treatment fluid comprises a gelling agent and a crosslinking agent,
wherein the aqueous non-emulsified breaking composition comprises water; at least one water soluble organic peroxide which is tert-butyl hydroperoxide, and at least one alcohol selected from the group consisting of propylene glycol, a butyl alcohol, a monosaccharide, a disaccharide and a combination thereof,
wherein the aqueous non-emulsified breaker composition causes the aqueous treatment fluid to have a reduced viscosity at a temperature of 90-300° F., and
wherein the aqueous non-emulsified breaker composition causes the aqueous treatment fluid to maintain a reduced viscosity for a period of time after the temperature is reduced from 90-300° F.

21. The method according to claim 20, wherein the aqueous non-emulsified breaker composition causes the aqueous treatment fluid to maintain a reduced viscosity for a period of time after the temperature is reduced from 90-300° F. to room temperature.

22. The method according to claim 20, wherein the at least one water soluble organic peroxide comprises tert-butyl hydroperoxide and the at least one alcohol comprises propylene glycol.

23. The method according to claim 20, wherein the at least one gelling agent comprises a guar or derivatized guar polymer, and the at least one crosslinking agent is selected from the group consisting of borate crosslinkers, zirconium crosslinkers, aluminum crosslinkers, titanium crosslinkers, chromium organometallic crosslinkers and a combination thereof.

24. The method according to claim 20 comprising injecting the aqueous treatment fluid and the aqueous non-emulsified breaking composition into the subterranean formation simultaneously.

* * * * *